Sept. 9, 1924.                                                       1,508,041
                            H. R. WINTON
               STRAINER AND FISH TRAP FOR WATER LINES
                          Filed Aug. 21, 1922
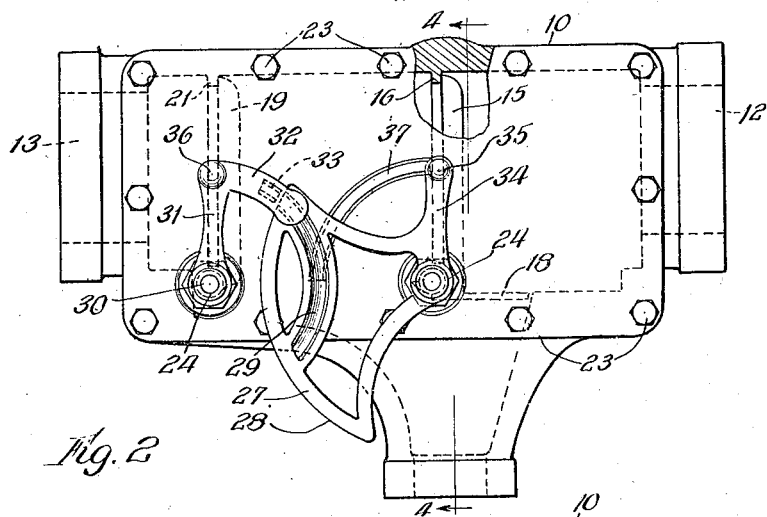
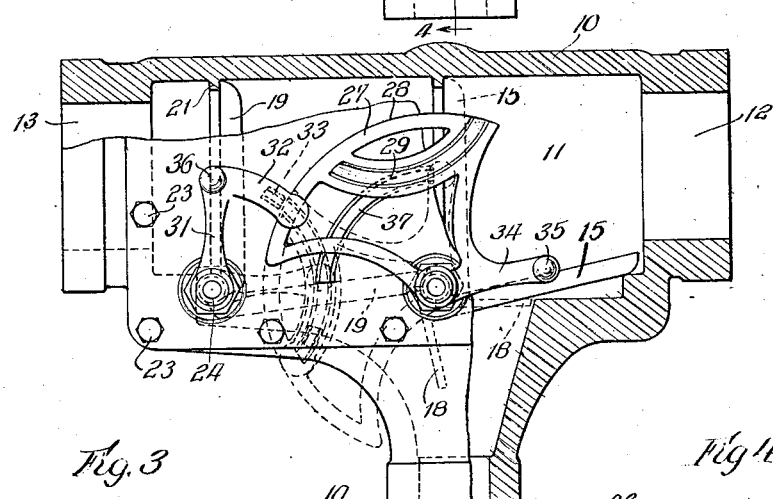
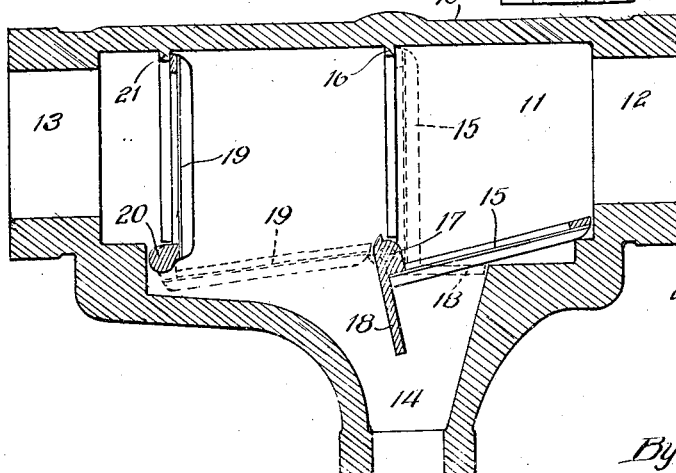
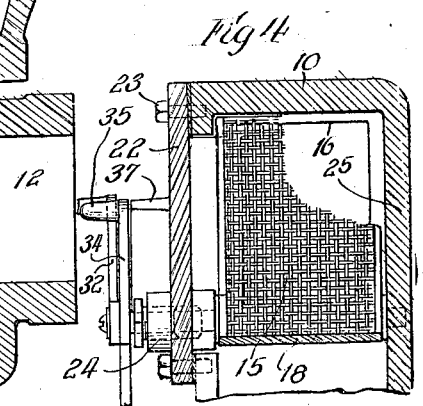
Inventor:
Hugo R. Winton
By: Wm. J. Bell
Atty.

Patented Sept. 9, 1924.

1,508,041

UNITED STATES PATENT OFFICE.

HUGO R. WINTON, OF CHICAGO, ILLINOIS, ASSIGNOR OF ONE-HALF TO CHARLES T. DENKER, OF TIMMINS, ONTARIO, CANADA.

STRAINER AND FISH TRAP FOR WATER LINES.

Application filed August 21, 1922. Serial No. 583,085.

*To all whom it may concern:*

Be it known that I, HUGO R. WINTON, a citizen of the United States, residing at Chicago, in the county of Cook and State of Illinois, have invented certain new and useful Improvements in Strainers and Fish Traps for Water Lines, of which the following is a specification.

This invention relates to strainers and fish traps for water lines, and has for its principal object to permit them to be easily and quickly cleaned without putting the lines out of service and at the same time preventing the lines from being left unprotected.

A further object of the invention is to provide interlocking means between a plurality of strainers to insure that one of them will always be across the main passage of the lines.

A further object of the invention is to provide a self-cleaning strainer and trap that will not become clogged by sand or other foreign matter when the strainers are swung from normal position to cleaning position.

Further objects of the invention will become apparent as the description is read in connection with the accompanying drawing illustrating a selected embodiment of the invention, and in which—

Figs. 1 and 2 are side elevations partly in section illustrating different positions of the parts;

Fig. 3 is a longitudinal sectional view showing with solid lines the primary strainer in cleaning position and the secondary strainer in operating position, and with dotted lines the primary strainer in operating position and the secondary strainer in cleaning position; and Fig. 4 is a transverse sectional view on the line 4—4 of Fig. 1.

The invention is here embodied in a connection for water lines and includes a casing 10 having a chamber 11 therein, which with the inlet 12 and the outlet 13 forms the main passage of the line. A by-pass 14 leads off from the side of the chamber to a suitable valve or the like and is used for blowing out the trap to clean it and the strainer. A strainer 15 pivoted in the sides of the connection is adapted to swing across the main passage and lie against a ledge 16 to divide the chamber 11 into a primary trap and a secondary trap. The axis 17 of the strainer 15 preferably lies across the by-pass 14 and the strainer is equipped with a valve 18 that normally lies across the by-pass at the edge of the primary trap.

The secondary trap is equipped with a strainer 19 pivoted at 20 and normally lying against a ledge 21. One side 22 of the casing is preferably removably secured thereto as by bolts 23 and the strainers are preferably mounted in this side plate so as to be assembled and dismounted therewith. The shafts of the strainers are equipped with stuffing boxes 24 at the end carried by the plate 22 and their opposite ends fit into suitable bearings in the fixed side 25.

The ledges 16 and 21 preferably extend across three sides of the casing and afford a fairly tight joint with the frames of the strainer. The strainer 15 and the valve 18 normally stop all foreign matter coming through the line and the strainer 19 is chiefly of service when the strainer 15 is being cleaned though it may also serve to strain out the finer particles that get by the strainer 15.

Normally both strainers lie across the main passage. When it is desired to clean the trap, the strainer 15 and valve are swung to the solid line position shown in Fig. 3 in which the water from the primary trap passing through the strainer to the by-pass 14 will thoroughly wash out the strainer and free it from all foreign matter. During this operation the strainer 19 is kept in normal position against the ledge 21 so as to protect the line. After the strainer 15 has been cleaned, it is returned to normal position and the strainer 19 is swung to the dotted line position shown in Fig. 3 when the water passing from the secondary trap to the by-pass washes it clean.

It is particularly important to have the valve 18 swing back or down into the by-pass 14 so that sand or other foreign matter that has collected in the trap can not cause this valve to jam. Even though there is a large amount of foreign matter in the primary trap, if the by-pass is open and the strainer 15 with the valve 18 is rotated towards cleaning position, the rushing water will take out all the foreign matter from the trap and also clean and clear the strainer.

In order to insure that one of the strainers will always lie across the main passage, I prefer to interlock the strainers so that movement of one of them from its normal position will lock the other in that position. As illustrated in the drawing, the strainer 15 is equipped with a segment 27 having a curved surface 28 lying on an arc whose center is in the axis 17. The segment is also provided with a curved groove or slot 29 lying on an arc whose center is in the axis 30 about which the strainer 19 swings. The strainer 19 is equipped with an arm 31 having a short segment 32 which carries a lug 33 adapted to move along the slot 29 or to cooperate with the curved surface 28 as conditions may require. The segment 27 is equipped with an arm 34 having a handle 35 by which the segment and the strainer 15 may be moved from normal position to cleaning position. The arm 31 has a similar handle 36 by which the screen 19 and the segment 32 may give similar movement. When the stuffing boxes 24 project laterally from the side 22 it will be convenient to provide this side with a curved flange 37 adapted to support the segment 27 and prevent it from being bent out of cooperating relation with the lock 33. When it is desired to clean the trap, the handle 35 is grasped and the strainer 15 swung to the solid line position in Figs. 2 and 3. This moves the segments 27 from the solid line position shown in Fig. 1 to the solid line position shown in Fig. 2 in which the curved surface 28 lies in the path of the lug 33 and prevents the strainer 19 from leaving normal position.

After the strainer 15 and the primary trap have been cleaned, the parts are restored to the position shown in Fig. 1 and then the handle 36 is moved to swing the strainer 19 and the arm 31 from the position shown in solid lines to the position shown in dotted lines in Fig. 2. This movement places the lug 33 in the passage 29 and thereby locks the segment 27 and consequently the strainer 15 in normal position. By making the passage 29 substantially the same width as the lug 33 and locating the lug 33 close to the surface 28, a very slight movement of one of the strainers from normal position serves to lock the other strainer in that position until the first strainer is returned entirely to seated position against its ledge. This insures that one strainer will always be across the main passage and tight against its ledge so as to protect the line leading to the building.

The construction illustrated is simple and effective and it permits the casing, the frames and the strainers and the interlocking elements to be cast in a form ready for use and limits the machine work to the stuffing boxes and the joint between the removable side and the remainder of the casing. This makes it possible to manufacture the device very cheaply.

I am aware that changes may be made in the form, construction and arrangement of the invention, as set forth in the selected embodiment herein, without departing from the scope or sacrificing any of its material advantages, and I therefore reserve the right to make all such changes as fairly fall within the scope of the following claims.

I claim:

1. A water line connection having a main passage and a by-pass, a plurality of strainers arranged across the main passage to strain the water passing therethrough and adapted to swing in position across the by-pass, and means to insure that one strainer will always be across the main passage.

2. A water line connection having a main passage and a by-pass, a plurality of strainers normally lying across the main passage and mounted to swing across the by-pass, and interlocking means connected with the strainers to prevent all of them from being swung across the by-pass at one time.

3. In a water line, a connection having a main passage and a by-pass, a pair of strainers each pivoted to swing from a position across the main passage to a position across the by-pass, and means operated by the swinging movement of one strainer to prevent swinging movement of the other strainer.

4. In a water line, a connection having a main passage and a by-pass, a pair of strainers each mounted to swing from a normal position across the main passage to a cleaning position across the by-pass, and interlocking means connected with the strainers permitting either to move freely when the other is in normal position and preventing either from moving when the other is in cleaning position.

5. In a water line, a connection having a main passage and a by-pass, a pair of strainers normally arranged across the main passage and adapted to swing to a cleaning position across the by-pass, and cooperating means connected with the strainers adapted to lock either strainer in normal position when the other strainer is moved from normal position.

6. In a water line, a connection having a main passage and a by-pass, a pair of strainers mounted to swing from a normal position across the main passage to a cleaning position across the by-pass, a segment carried by one strainer, and means carried by the other strainer cooperating with said segment to maintain one of the strainers in normal position.

7. In a water line, a connection having a main passage and a by-pass, a pair of strainers mounted to swing from a normal position across the main passage to a cleaning position across the by-pass, a sector carried by one strainer and having two arcuate surfaces, and means carried by the other strainer cooperating with said surfaces to lock one strainer in normal position when the other is moved away from normal position.

8. In a water line, a connection having a main passage and a by-pass, a pair of strainers pivotally mounted in said connection to swing from a normal position across the main passage to a cleaning position across the by-pass, means carried by one of said strainers and having an arcuate surface disposed concentrically with respect to the axis of that strainer, and a second arcuate surface adapted to be arranged concentrically with the axis of the other strainer, and an arm carried by the other strainer having means cooperating with said surfaces to interlock said strainer.

9. In a water line, a connection having a main passage and a by-pass, a strainer adapted to swing from a normal position across the main passage to a cleaning position across the by-pass, a valve mounted to move simultaneously with the strainer from a position across the by-pass to a position along the by-pass, and a second strainer adapted to swing from a normal position across the main passage to a cleaning position across the by-pass.

10. In a water line, a connection having a main passage and a by-pass, a strainer adapted to swing from a normal position across the main passage to a cleaning position across the by-pass, a valve adapted to lie across the by-pass when the strainer is in normal position and to swing into the by-pass when the strainer moves towards cleaning position, and a second strainer adapted to swing from a normal position across the main passage to a cleaning position across the by-pass.

HUGO R. WINTON.